United States Patent

Bischoff-Bogon et al.

[11] Patent Number: 5,968,604
[45] Date of Patent: Oct. 19, 1999

[54] FRICTION ELEMENT AND METHOD FOR THE PRODUCTION THEREOF

[75] Inventors: Werner Bischoff-Bogon, Bremen; Friedrich Gebhard, Lauf, both of Germany

[73] Assignees: Euroflamm, GmbH, Germany; Diehl Stiftung & Co.

[21] Appl. No.: 09/150,625

[22] Filed: Jun. 19, 1998

Related U.S. Application Data

[63] Continuation of application No. PCT/EP96/05702, Dec. 19, 1996.

[30] Foreign Application Priority Data

Dec. 21, 1995 [DE] Germany .......................... 195 48 124

[51] Int. Cl.⁶ .................................................. C23C 4/08
[52] U.S. Cl. ........................................... 427/456; 427/455
[58] Field of Search ..................... 427/455, 456, 427/355

[56] References Cited

U.S. PATENT DOCUMENTS

| | | |
|---|---|---|
| 2,775,323 | 12/1956 | English . |
| 5,326,646 | 7/1994 | Nakashima et al. .................... 428/561 |

FOREIGN PATENT DOCUMENTS

| | | |
|---|---|---|
| 2411895 | 7/1979 | France . |
| 3723999 | 5/1988 | Germany . |
| 3805794 | 9/1988 | Germany . |
| 3809994 | 10/1988 | Germany . |
| 3705661 | 3/1989 | Germany . |
| 4035264 | 5/1992 | Germany . |
| 4428153 | 2/1996 | Germany . |
| 19539498 | 5/1996 | Germany . |

OTHER PUBLICATIONS

Zapf, Gerhard; Nachpressen nach dem Sintern erzielt bestimmte Toleranzen, German magazine: "Z. Maschinenmarkt", 79 (1973), pp. 1746–1749. (no month date).

Wires for thermal spraying; wires for flame spraying —DIN 8556 Part 1 Mar. 1979—pp. 1–9.

Filler metals for thermal spraying; solid wires for arc spraying; technical delivery conditions.—DIN 8566 Part 2, Dec. 1984 pp. 1–7.

*Primary Examiner*—Katherine A. Bareford
*Attorney, Agent, or Firm*—William A. Drucker

[57] ABSTRACT

A friction element has a base element on which a coating is applied by thermal spraying of a copper alloy. The copper alloy contains 27 to 35 wt % zinc, 4 to 6 wt % aluminum, 2 to 4 wt % nickel, 0.5 to 2 wt % titanium, and copper as the remainder, with random contaminants. The copper alloy is applied onto a base element by thermal spraying, and requires only a finish treatment by stamping to achieve good tribological properties and wear resistance that are comparable to molybdenum coatings. Alternative copper-zinc alloys can have, in particular, manganese, iron, and lead constituents.

8 Claims, 1 Drawing Sheet

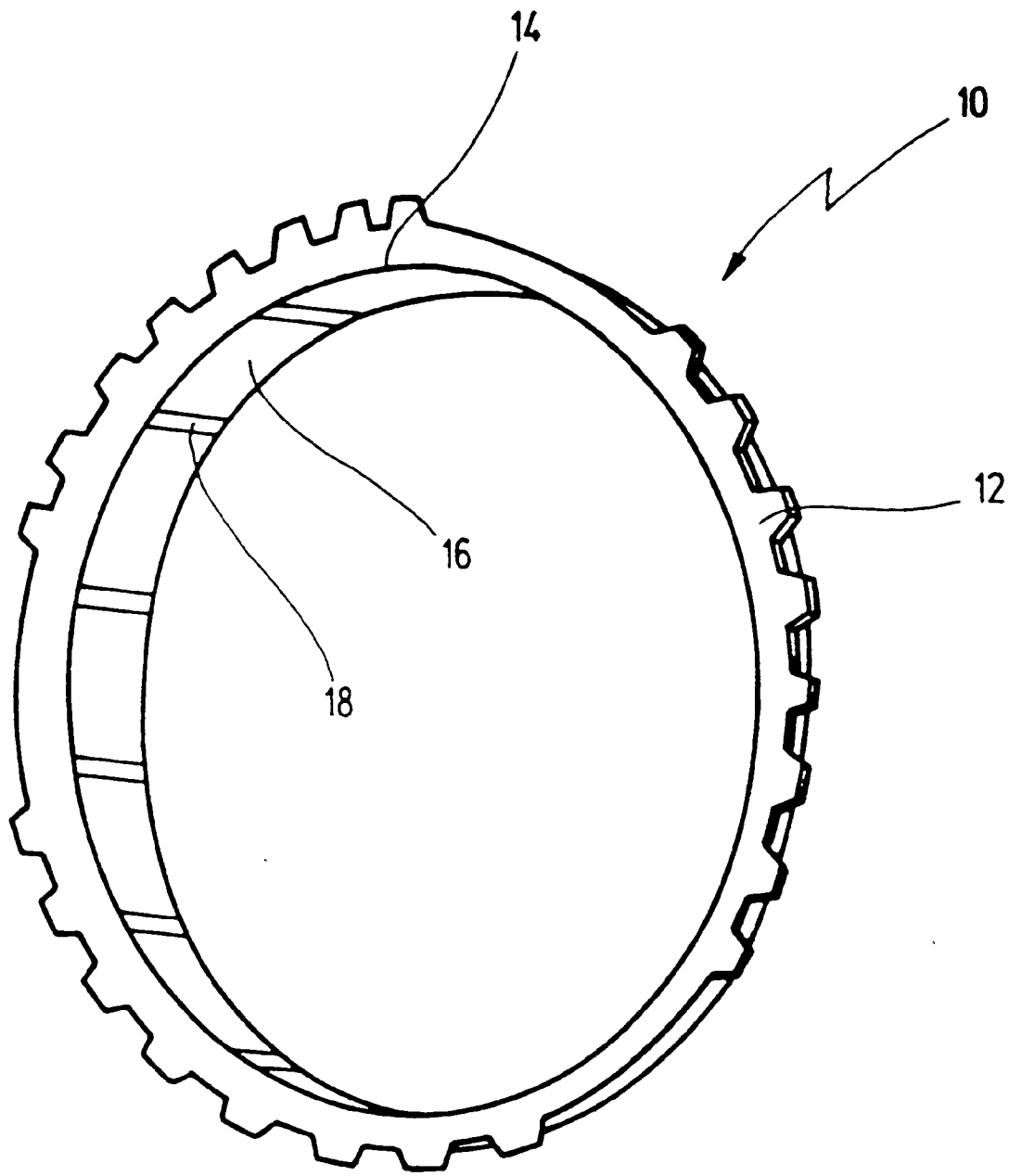

FRICTION ELEMENT AND METHOD FOR THE PRODUCTION THEREOF

CROSS REFERENCE OF PENDING APPLICATION

This application is a continuation of pending international application PCT/EP96/05702 filed on Dec. 19, 1996.

BACKGROUND OF THE INVENTION

The invention relates to a friction element having a base element on which a coating is applied by thermal spraying of a copper alloy.

The invention further concerns a method for producing a friction element in which a coating is applied onto a base element by thermal spraying of a copper alloy.

A friction element of this kind, and a method of this kind for producing a friction element, are known from DE-C 3 637 386.

According to these, for the production of a synchronizer ring which consists substantially of a toroidal metal body having an adjoined external tooth set, a base adhesion layer made of a bronze alloy, an aluminum/nickel alloy, or the like is first applied onto the metal base element using the plasma spray method.

A scatter-sintered friction lining is then applied onto this base adhesion layer. For this, the base element is assembled to an insert element. The insert element has centering means for retaining the base element in a defined position, and a countersurface arranged at a defined spacing from the surface. The cavity constituted by the defined spacing, the surface, and the countersurface is filled with a scatter-sintered powder, and the insert element is sintered to the base element when the cavity is filled.

In this fashion, a friction lining produced by the sintering method can be attached to the base element without additional mechanical immobilization means.

Many other methods are also known for producing scatter-sintered friction linings (cf., for example, DE-C 3 417 813 and EP-B-0 292 468).

An additional friction layer of molybdenum must usually also be applied onto the scatter-sintered friction linings in order to achieve the necessary service life (cf. DE-A-2 055 346, DE-C-3 412 779).

The production of scatter-sintered friction linings is thus relatively complex and expensive.

It is furthermore fundamentally known to use, as the material for single-metal synchronizer rings, special brasses of the CuZn40A12 type, since these materials are distinguished by a good combination of coefficient of friction, wear resistance, and mechanical strength. For synchronizer rings subject to greater mechanical stresses, special brasses containing manganese, aluminum, iron, silicon, nickel, tin, and/or lead are used (DE-C 3 412 779). Here again, the necessary wear resistance of these synchronizer rings that can carry higher mechanical loads is achieved by means of an applied molybdenum coating.

A feature common to the previously known synchronizer rings is the fact that a series of complex process steps is necessary in order to produce synchronizer rings for high loads, generally including the application of a molybdenum coating since only a molybdenum coating has the necessary wear resistance required, among other applications, for synchronizer rings that are to be used in a motor vehicle transmission. In addition, a complex finish treatment by means of grinding is generally necessary in order to achieve the necessary surface quality for the friction surface. Coating with molybdenum has, however, recently proven problematic for various reasons. On the one hand, molybdenum is a comparatively expensive metal which requires complex and expensive tools for machining because of its high wear resistance. On the other hand, the result of using molybdenum as a wear-resistant layer on synchronizer rings is that the transmission in question must be treated as special waste when later disposed of. An effort has therefore recently been made to find ways of developing synchronizer rings in which a wear-resistant molybdenum coating can be dispensed with.

SUMMARY OF THE INVENTION

It is thus the object of the invention to create a friction lining without a molybdenum coating, and a method for producing the same, which can be produced in simple and economical fashion, requires the least possible finish treatment, and at the same time exhibits good frictional parameters and wear resistance.

This object is achieved by a method for producing a friction element in which a coating is applied onto a base element by thermal spraying of a copper alloy, in that the copper alloy contains 27 to 35 wt % zinc, 4 to 6 wt % aluminum, 0.5 to 2 wt % titanium, 2 to 4 wt % nickel, and copper as the remainder, with random contaminants.

With respect to the friction element this object is achieved in that the copper alloy contains 27 to 35 wt % zinc, 4 to 6 wt % aluminium, 0.5 to 2 wt % titanium, 2 to 4 wt % nickel, as well as copper as the remainder, with random contaminants.

The object of the invention is completely achieved in this fashion, since because the friction lining is produced, according to the invention, by thermal spraying, the result of the specific selection of alloys is on the one hand that, merely as a result of thermal spraying, such a high level of surface quality is achieved that a finish treatment by means of grinding is no longer necessary. On the other hand, the friction element according to the invention has sufficient ductility along with good wear resistance and good tribological properties.

Thermal spraying generates a surface whose $R_z$ value is already between approximately 40 micrometers and 50 micrometers, and is thus already relatively favorable. The coating produced in this fashion, which preferably has a layer thickness between approximately 0.1 and 0.2 mm, in particular between approximately 0.12 and 0.15 mm, is finish-treated, in a preferred development of the invention, merely by stamping, thus imparting to the surface an $R_z$ value of approximately 20 micrometers.

In accordance with the method according to the invention, it is thus possible to achieve a high level of surface quality without a complex finish treatment which must be performed in the case of conventional friction linings, generally by means of grinding.

Synchronizer rings produced according to the invention thus meet even the most stringent requirements in terms of wear resistance, toughness, high specific frictional work, and high specific frictional power, especially when synthetic oils are used with hardened steel as the frictional countersurface. The stick-slip effect is also greatly diminished as compared with conventional friction elements.

Friction linings produced according to the invention are suitable for all conceivable applications, for use in shoe, disk, and cone clutches and brakes, in synchronizer rings, multiplate clutches and brakes, limited-slip differentials, etc.

The copper alloy that, according to the invention, is applied onto the base element by thermal spraying has a series of alloy constituents which on the one hand stabilize the alloy during thermal spraying and on the other hand allow a tough, wear-resistant layer with good tribological properties to be obtained.

The titanium constituents serve to generate hard inclusions that are finely dispersed in the metal matrix and, because of the high temperature during thermal spraying, are for the most part present in oxide form.

Particularly preferred in this context is titanium, at a concentration of preferably approximately 0.5 to 1.5 wt %. It has been shown in this context that this results in particularly good wear resistance.

The further constituents of the copper alloy, preferably approximately 2 to 4 wt % nickel, as well as 4 to 6 wt % aluminum or silicon, in particular approximately 4 to 6 wt % aluminum, provide thermal stabilization of the copper alloy during thermal spraying, during which temperatures on the order of 2000° C. or more can occur depending on the method chosen. If the concentration of the aforementioned additives were lower, the copper alloy would not be sufficiently thermally stable for thermal spraying, so that individual constituents would segregate and undesirable coarsely distributed random phases would form in the matrix, so that the desired toughness and wear resistance of the matrix, as well as the tribological properties, would no longer be attained.

Particularly advantageous results have been achieved with a copper alloy that contains approximately 59 to 61 percent copper, approximately 27 to 35 percent zinc, approximately 0.5 to 2 percent titanium, approximately 2 to 4 percent nickel, and approximately 4 to 6 percent aluminum.

After this coating is generated on the base element, only a finish treatment by stamping is necessary to achieve the necessary friction parameters required for even the most stringent requirements (for example in synchronizer rings), and high wear resistance. The coating has a hardness of approximately 600 to 700 HV, and preferably a layer thickness of approximately 0.12 to 0.15 mm. A certain residual porosity in the coating serves on the one hand to absorb lubricant and on the other hand to dissipate heat.

It is understood that the features of the invention mentioned above and those yet to be explained below can be used not only in the respective combinations indicated, but also in other combinations or in isolation, without leaving the context of the invention.

Further features and advantages of the invention are evident from the description below of a preferred exemplifying embodiment with reference to the drawing.

BRIEF DESCRIPTION OF THE DRAWING

The single Figure shows a synchronizer ring with tapered friction surface, in a slightly simplified perspective depiction.

DETAILED DESCRIPTION OF PREFERRED EMBODIMENTS

The Figure depicts a friction lining according to the invention, depicted using the example of a synchronizer ring and designated in its entirety with the number 10.

Synchronizer ring 10 comprises a tapered friction surface 16 in which drainage grooves 18 for oil discharge are provided.

Friction surface 16 is applied onto a base element 14 made of sintered steel, the rim of which has, in known fashion, peripheral tooth sets 12 separated from one another by uniform angular spacings.

Prior to the application of coating 16, the base element is sand-blasted in the region of the coating to be applied by thermal spraying, in order to ensure good adhesion of the coating.

According to the invention, a copper alloy which contains approximately 27 to 35 wt % zinc, 0.5 to 2 wt % titanium, 2 to 4 wt % nickel, and 4 to 6 wt % aluminum, as well as copper as remainder, is used to produce the coating on friction surface 16.

A preferred copper alloy (alloy L7), having approximately 60 percent copper, 30.5 percent zinc, 1.5 percent titanium, 3 percent nickel, and 5 percent aluminum, was melted, with the use of copper pre-alloys, in a crucible furnace and after cooling was atomized under an inert gas atmosphere. The resulting powder was then cold-pressed and post-calibrated to produce a wire suitable for thermal spraying. Alternatively, the alloy in question can also be used in powder form for thermal spraying.

This wire was used to apply onto the base element, by flame spraying, a coating with a layer thickness of approximately 0.12 to 0.15. After being produced by flame spraying, coating 16 had an $R_Z$ value of approximately 40 to 50 micrometers. A finish treatment of the surface of friction surface 16 was then performed by stamping, leading to an $R_Z$ value of approximately 20 micrometers with a hardness of approximately 600 to 700 HV.

Friction surface 16 produced in this fashion was subjected to friction experiments using a synthetic oil, with a hardened steel as frictional countersurface.

These indicated a diminished stick-slip effect as compared with conventional scatter-sintered synchronizer rings, good specific frictional work and power, and high fade resistance, meeting the most stringent requirements.

Friction linings produced in accordance with the invention are distinguished, as compared with conventional friction linings, by a considerably simplified production process, since only a single coating needs to be applied by thermal spraying onto the base element in order to achieve the necessary friction parameters and wear resistance, and in most cases only a finish treatment by stamping is necessary.

The result, as compared with the existing art, is a considerably simplified, economical production process.

Several alternative copper alloys, designated L2 to L6, are summarized in Table 1; L6 corresponds approximately to the composition of L7.

The results of test stand frictional coefficient experiments with synchronizer rings that had been coated by thermal spraying are summarized in Table 2. A thermally sprayed molybdenum coating, which of course has particularly high wear resistance, was also tested for comparison.

The results show that alloys L6/L7 in particular yield outstanding results which are comparable to molybdenum in terms of wear resistance and coefficient of friction. Critical factors for use in transmissions are the number of cycles achieved, a low reserve travel loss, and a dynamic frictional coefficient of at least 0.075, after 15,000 cycles if possible.

TABLE 1

|    | Cu    | Zn        | Al    | Mn    | Si      | Ni   | Co     | Ti | Fe      | Pb      |
|----|-------|-----------|-------|-------|---------|------|--------|-----|---------|---------|
| L2 | 57–58 | Remainder | 1.5–2 | 1.5–2 | 0.4–0.7 | —    | —      | —  | 0.4–0.7 | 0.4–0.7 |
| L3 | 70    | Remainder | 5     | 7.6   | 2       | —    | —      | —  | 1       | 0.8     |
| L4 | 59.5  | Remainder | 4     | 0.6   | 0.8     | 3    | 1.3    | —  | 0.7     | 0.5     |
| L5 | 54–55 | Remainder | 3–4   | —     | 2–2.5   | 6–7  | —      | —  | 0.4–0.7 | —       |
| L6 | 59–61 | Remainder | 4–6   | —     | —       | 2–4  | —      | 0.5–2 | —    | —       |

TABLE 2

| Experiment No. | Coating | Friction surface geometry | Gearbox oil | No. of cycles achieved | Reserve travel loss (mm) | Dynamic frictional coef-ficient At start of experiment | Dynamic frictional coef-ficient After no. of cycles has been reached | Static frictional coef-ficient after break-in |
|---|---|---|---|---|---|---|---|---|
| Fi 25-17/18 | L7 | Webs | Oliofiat ZC80/S (APIGL4) | 15,000 | 0.16–0.20 | 0.135 | 0.085 | 0.10 |
| Fi 25-19/20 | L7 | Coarse threads with oil grooves | Oliofiat ZC80/S (APIGL4) | 15,000 | 0.28–0.30 | 0.13 | 0.085 | 0.10 |
| Fi 25-21 | L3 | Coarse threads with oil grooves | Oliofiat ZC80/S (APIGL4) | 150 | 0.65 | 0.13 | 0.125 | |
| Fi 25-27 | L3 | Webs | Oliofiat ZC80/S (APIGL4) | 1800 | 0.71 | 0.135 | 0.115 | |
| Fi 25-1 | L4 | Coarse threads with oil grooves | Oliofiat ZC80/S (APIGL4) | 700 | 0.90 | 0.12 | 0.12 | |
| Fi 25-5 | L4 | Plateaus | Oliofiat ZC80/S (APIGL4) | 7500 | 0.90 | 0.125 | 0.075 | |
| Fi 25-7 | L4 | Webs | Oliofat ZC80/S (APIGL4) | 5300 | 0.86 | 0.125 | 0.0075 | 0.090–0.095 |
| RF21-23/24 | Molybdenum | Coarse threads | Oliofiat ZC80/S (APIGL4) | 15,000 | 0.07–0.10 | 0.125–0.130 | 0.085–0.090 | 0.12 |
| Fi25-35/37 | L7 | Coarse threads | Shell PAE1583 (ATF) | 15,000 | 0.24–0.34 | 0.14–0.145 | 0.11 | |

We claim:

1. A method for producing a friction element which comprises the steps of:
   (a) providing a base; and
   (b) applying a coating onto said base element by thermal spraying of a copper alloy, wherein a copper alloy is used which contains 27 to 35 wt % zinc, 4 to 6 wt % aluminum, 0.5 to 2 wt % titanium, and 2 to 4 wt % nickel, and copper as the remainder, with random contaminants.

2. The method as defined in claim 1, wherein said copper alloy is used which contains 0.5 to 1.5 wt % titanium.

3. The method as defined in claim 2, wherein the coating, after being produced by thermal spraying, is finish-treated by stamping.

4. The method of claim 3, further including the step of roughening the surface of said base element prior to application thereto of said copper alloy by thermal spraying.

5. The method of claim 2, further including the step of roughening the surface of said base element prior to application thereto of said copper alloy by thermal spraying.

6. The method as defined in claim 1, wherein the coating, after being produced by thermal spraying, is finish-treated by stamping.

7. The method of claim 6, further including the step of roughening the surface of said base element prior to application thereto of said copper alloy by thermal spraying.

8. The method of claim 1, further including the step of roughening the surface of said base element prior to application thereto of said copper alloy by thermal spraying.

* * * * *